United States Patent [19]

Berner

[11] 3,974,735
[45] Aug. 17, 1976

[54] ANCHORING DEVICE FOR SCREWS
[76] Inventor: Albert Berner, Weckrain 7, 7118 Kunzelsau, Germany
[22] Filed: Dec. 10, 1974
[21] Appl. No.: 531,307

[52] U.S. Cl.................................. 85/72; 85/74; 85/76
[51] Int. Cl.²...................................... F16B 29/00
[58] Field of Search............... 85/72, 73, 74, 75, 76, 85/39, 26

[56] References Cited
UNITED STATES PATENTS

| | | | |
|---|---|---|---|
| 784,845 | 3/1905 | Evans | 85/73 |
| 979,853 | 12/1910 | Hartshorn | 85/75 |
| 1,120,412 | 12/1914 | Rohmer | 85/76 |
| 1,808,318 | 6/1931 | Pleister | 85/72 |
| 2,108,842 | 2/1938 | Bazzoni | 85/72 |
| 2,474,281 | 6/1949 | Ruiz | 85/26 |
| 3,313,083 | 4/1967 | Flora | 85/72 |

FOREIGN PATENTS OR APPLICATIONS

| | | | |
|---|---|---|---|
| 127,529 | 5/1948 | Australia | 85/72 |
| 1,400,857 | 1/1969 | Germany | 85/75 |
| 296,780 | 5/1932 | Italy | 85/76 |
| 663,997 | 1/1952 | United Kingdom | 85/74 |
| 873,980 | 8/1961 | United Kingdom | 85/73 |

Primary Examiner—Roy D. Frazier
Assistant Examiner—Rodney H. Bonck
Attorney, Agent, or Firm—Edwin E. Greigg

[57] ABSTRACT

An anchoring device for screws having a casing in the form of a slitted expansion dowel, and an associated expansion body. The casing and the body are connected by a rupturable bridge which can be ruptured by axial movement of the body. The body has suitable elements, embodied as wedge tabs, which engages the slits of the casing. The casing and the body are made of synthetic material. The expansion body has elements which are moved radially outward, and preferably spread, as a result of form-fitting cooperation with countersurfaces located on the casing when the body approaches thereto.

4 Claims, 5 Drawing Figures

ANCHORING DEVICE FOR SCREWS

BACKGROUND OF THE INVENTION

This invention relates to an anchoring device for wood and machine screws. The present invention relates, more particularly, to an anchoring device for screws which includes a casing, embodied as a slitted expansion dowel, and an associated expansion body which is substantially cylindrical and can be moved axially by a screw, in the manner of a nut, with respect to the casing. The expansion body is provided with suitable shaped elements for engaging the slits of the casing. In the anchoring device, the casing, as well as the expansion body, is made of synthetic material and are connected to one another, when not in use, by at least one connection bridge which is easily ruptured by the axial motion of the expansion body.

Anchoring devices of this kind are known from the German Utility Model Document 7,129,315 (Gebrauchsmusterschrift).

SUMMARY OF THE INVENTION

It is the principal object of the invention to provide an anchoring device in which an expansion member is not only pulled forward by spreading the casing for achieving an anchoring effect, but also cooperates with the anchoring provided by the casing in such a way that the total anchoring effect is substantially increased.

The foregoing object, as well as others which are to become apparent from the text below, are achieved in accordance with the present invention by providing an anchoring device for wood and machine screws which includes a casing, embodied as a slitted expansion dowel, and an associated expansion body which is substantially cylindrical and can be moved axially by a screw, in the manner of a nut, with respect to the casing. The expansion body is provided with suitable elements for engaging the slits of the casing. The casing and the expansion body are made of synthetic material and are initially connected to one another, when not in use, by at least one connection bridge which is easily ruptured by axial motion of the expansion body. The salient novel features of the anchoring device, according to the present invention are that the expansion body is provided with elements which are necessarily moved radially outward and are preferably spread outward by form-fitting cooperation with counter-surfaces located on the casing, when the expansion body approaches thereto.

In one preferred varient, the casing is made expandable by providing it with two longitudinal slits emanating from its insertion end and permitting, in known manner, a transverse expandability. In that varient, the elements on the expansion body capable of outward radial motion are movable in a plane passing through the slits in the casing.

The fact that, in addition to the slitted expansion dowel whose casing is pressed radially outward against the inner wall of the bore hole, the radially movable and preferably also expandable elements of the expansion body are also pressed against this wall, the net result is an increased compressive force within the bore hole over that which would be obtained if the casing alone were expanded. This results in correspondingly improved pullout parameters. Thus, the area of use of the anchoring device becomes particularly large, good pullout prevention parameters having been achieved even in very soft stone and when the bore hole has considerable clearance with respect to the diameters of the casing and of the expansion body.

In that varient in which the casing has two longitudinal slits originating at the insertion end, hence in which it is split into two expandable halves, the radially outwardly movable elements of the expansion body are moved in a plane containing the slits of the casing, and the spreading or expansion of the expandable halves and the movable elements is effected in two mutually perpendicular directions. Thus there is a radial compression with respect to four distinct locations distributed around the circumference of the hole. By suitable choice of dimensions, it is possible to cause the respective pairs of pressure points to be located at different depths in the hole, thus making suitable use of possible different clearances occurring at different depths in the hole and also of a different constituency of the material in which the hole is bored. Furthermore, a suitable choice of dimensions makes possible that the cooperation of the radially outwardly movable elements of the expansion body with the counter-surfaces of the casing, which causes this motion and this cooperation, occurs after only a very small axial motion of the expansion body, so that, in this way, the supplementary holding power of the expansion body occurs virtually at the start of the rotation of a screw and hence provides further security against co-rotation of the screw and device.

The anchoring device according to the invention is especially suitable for anchoring screws in soft and porous material, such as aerated concrete. A further varient of the anchoring device, according to the invention, which is especially suited for this purpose and in which the casing has anti-rotation fins at its rearward end, provides that more than two anti-rotation fins are located on the casing. The longitudinal slits of the casing are enlarged in the direction of the insertion end and form inclined edge surfaces which are inclined away from the narrower portion of the respective slits. This varient further provides that the expansion body, which is itself cylindrical and has a cylindrical axial void just as does the casing, has inclined, oblique surfaces provided at its rearmost end facing the casing and forms two wedge tabs wherein the inclined surfaces define the radially movable and expandable elements of the expansion body. Connecting bridges are provided leading from the inclined surfaces of the expansion body to the insertion end of the casing.

In all varients, the cylindrical shape of the interior voids, penetrating the casing and the expansion body, results in a secure guidance of the inserted wood or machine screws. In the casing, the central void has the same diameter or a larger diameter than the outside diameter of the threads of the wood or machine screws, whereas the void penetrating the expansion body has a diameter which, at least in the region of the insertion end, is somewhat smaller than the outside diameter of the wood or machine screw. In this region, the interior void of the expansion body may have internal threads whose pitch need not coincide with that of the wood or machine screw threads. Since the expansion body is made of synthetic material and since it cannot freely rotate, it is in all cases moved axially toward the casing when the wood or machine screw is screwed in and, just like a nut is prevented from co-rotation with the screw.

The anti-rotation fins are desirably positioned in substantially the same planes as the movable elements of the expansion body and in planes which are at 90° from the slits in the casing. A particularly simple construction is obtained by embodying the radially movable elements of the expansion body as wedge tabs since these same elements, which are effective as wedges for spreading the casing, are also themselves expansion chisel-shaped elements which are moved radially outward by the casing.

Other objects, features and advantages of the present invention are to become more apparent from the ensuing detailed description of an exemplary embodiment, taken in conjunction with the accompanying figures of drawing.

DESCRIPTION OF THE PREFERRED EMBODIMENT

Figure 1:
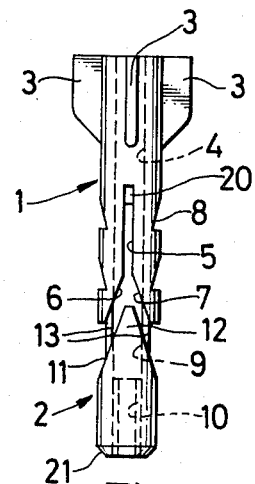
FIG. 1 is a front elevational view of an exemplary anchoring device for screws according to the present invention, viewed in the direction of one slit in the casing.
Figure 2:
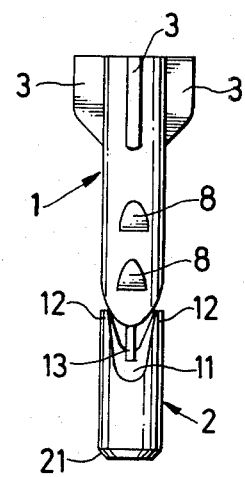
FIG. 2 is a view of the device shown in FIG. 1 rotated by 90°.

In FIG. 1, the rear portion of an exemplary embodiment of a device for anchoring screws includes a casing 1 shown toward the top, the insertion part of the device being formed by an expansion body 2, shown toward the bottom of this figure. The casing 1 and the expansion body 2 are connected together by easily ruptured bridges 13. At its rear end, the casing 1 has four anti-rotation fins 3. The casing 1 has a central void 4, in the shape of a circular cylinder, and is divided into two halves by two mutually diametrically opposed slits 5 which extend from the insertion end of casing 1 along approximately half of its length. At their lower ends, as shown in FIG. 1, the slits 5 are symmetrically enlarged on both sides, so that inclined edge surfaces 6 and 7 are formed which are oppositely inclined, by the same amount, away from the axis. The circumference of the casing 1 is provided with a plurality of recesses 8 which lend a sawtooth-like profile to the outer surface of the casing 1, as can be seen best in FIG. 1.

The expansion body 2 also has a cylindrical void 9 which is axially aligned with and can be considered to be a continuation of the cylindrical void 4 of the casing 1. As seen in FIG. 1, a region 10, seen toward the bottom of FIG. 1, of the void 9 penetrating the expansion body 2 is narrower than the preceding region and is also narrower than the void 4. In the example shown, the void 9 is provided with interior threads. At its top end, as viewed in FIG. 1, the end of the expansion body 2 facing the casing 1 is made wedge-shaped, by symmetrically inclined, oblique surfaces 11. Since the expansion body 2 is hollow, the remaining portions of the wall form oppositely lying wedge tabs 12 which can more or less extend into the enlarged, complementary terminations of the slits 5 in the casing 1 even in an not-yet-used device, depending on the choice of the length of the bridges 13.

As its insertion end, the expansion body 2 is conically narrowed by a bevelled surface 21.

Figure 3:
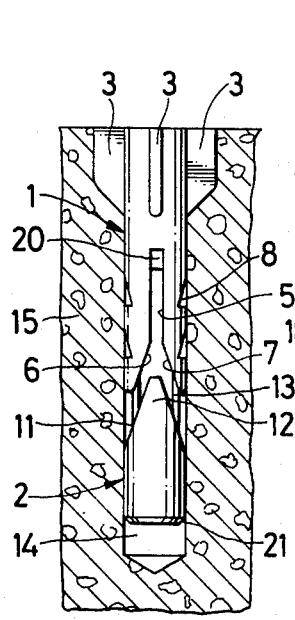
FIG. 3 is an illustration of the device shown in FIG. 1 when inserted into a hole bored in a wall.
Figure 4:
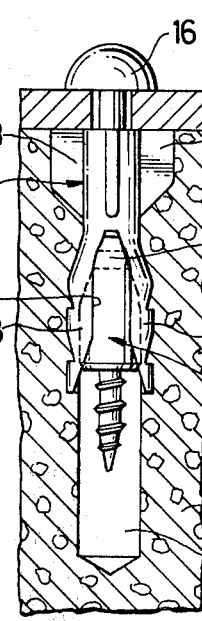
FIG. 4 is a view of the device as shown in FIG. 3 after insertion and tightening of a wood screw.

When the device is to be used, it is inserted into a hole 14 of suitable diameter within a wall 15 (FIG. 3), the anti-rotation fins 3 are inserted sufficiently far into the material of the wall 15 surrounding the entrance of the hole 14 that they are flush with the surface of the wall of the hole 14; hence it is presupposed that the wall material is sufficiently soft or porous that it is possible to push in or to hammer in the device to this extent.

Figure 5:
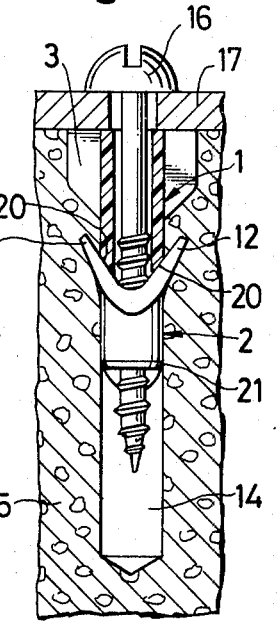
FIG. 5 is a view of the device and screw of FIG. 4, rotated by 90°.

When a wood screw 16 is inserted into the void 4 of the casing 1, for example, for the purpose of fastening a plate 17 on the wall 15, the screw 16 is screwed into the narrowed or threaded region 10 of the void 9, 10 within the expansion body 2, the latter is pulled into the casing 1 in the manner of a nut prevented from co-rotating. This co-rotation is prevented, firstly, because the expansion body 2 is connected by the bridges 13 with the casing 1, which is itself prevented from rotating by the anti-rotation fins 3. Furthermore, the inclined surfaces 11 of the expansion body 2 come to lie against the inclined edge surfaces 6 and 7 of the casing 1. When the expansion body 2 is further pulled in by turning the screw 16, the halves 18 and 19 of the casing 1 formed by the slits 5 are spread apart so that the outer surface of the spread halves 18 and 19 is pressed into the wall of the hole 14. As soon as the upper wedge tabs 12, as seen in the figures, abut against the countersurfaces 20 formed at the base of the slits 5, they are deviated radially outwardly and are pressed into the material forming the wall of the hole 14, as can be seen in FIG. 5.

The foregoing description and the accompanying figures of drawing relate to an exemplary, preferred embodiment of an anchoring device for screws provided by way of example and not by way of limitation. It is to be appreciated that numerous other embodiments and varients are possible within the spirit and scope of the invention, the scope being defined in the appended claims.

What is claimed is:

1. In an anchoring device for use with wood or machine screws consisting of a generally cylindrical casing in the form of a slitted expansion dowel and an associated, also generally cylindrical, expansion body which is axially displaceable towards the casing by means of a screw that engages the expansion body, in the manner of a nut which is prevented from rotating, for the purpose of expanding the casing in a radial direction, the casing and the expansion body being crossed by axial hollow chambers, and the slits in the casing extending over a region of the casing facing towards the insertion end, and the expansion body comprising suitable wedge-shaped faces to enable it to engage in the slits provided in the casing and thus to press them apart when the expansion body is tightened by means of the screw, the casing and the expansion body both consisting of plastic material and being connected together in the unused state by a connection means which is easily broken by the axial movement of the expansion body when it is tightened by the screw, the improvement which comprises:

said casing, wherein each slit formed therein has a closed end formed by a radially extending, inclined surface of said casing, a first portion adjacent the closed end of each slit defined by substantially parallel, longitudinally extending surfaces of said casing, and a second portion adjacent said first portion defined by surfaces of said casing which are longitudinally divergent in the direction of the insertion end of the casing so as to widen an open end of the slit at the insertion end of the casing; and said expansion body, which includes longitudinally extending, wedge-shaped tabs formed on a rear portion of the expansion body, the lateral end faces of each tab being oppositely inclined with respect to one another and forming said wedge-shaped faces for enabling the expansion body to engage said casing within said slits, and said expansion body being axially spaced from, and secured to, said casing by said connection means so that an end portion of each tab projects toward the open end of a corresponding slit of the casing;

whereby, as the screw engaging the expansion body is turned in a direction to cause axial movement of the expansion body toward the casing, after the connection means is ruptured and the casing is expanded radially outwards by the engagement and movement of the wedge-shaped tabs within the slits, the wedge-shaped tabs are forcibly deflected radially outwards by the inclined surfaces of the casing which form the closed ends of the slits.

2. An improved anchoring device, as described in claim 1, wherein the surfaces of the casing defining said second portions of said slits in the casing form inclined-edge, end faces corresponding to the inclination of the lateral end faces of said wedge-shaped tabs.

3. An improved anchoring device, as described in claim 1, wherein said casing has two said diagonally opposite slits formed therein, and said expansion body has two diagonally opposite wedge-shaped tabs.

4. An improved anchoring device, as described in claim 3, wherein said casing further comprises two pairs of anti-rotation fins extending radially outward from the rear portion of said casing in crosswise manner, one pair of said anti-rotation fins lying in the same plane as said slits formed in said casing, which plane also contains the outward direction of deviation of the wedge-shaped tabs.

* * * * *